United States Patent
Tang et al.

(10) Patent No.: US 10,635,519 B1
(45) Date of Patent: Apr. 28, 2020

(54) SYSTEMS AND METHODS FOR DETECTING AND REMEDYING SOFTWARE ANOMALIES

(71) Applicant: Uptake Technologies, Inc., Chicago, IL (US)

(72) Inventors: Yuan Tang, West Lafayette, IN (US); Tuo Li, Chicago, IL (US); James Herzog, Downers Grove, IL (US)

(73) Assignee: Uptake Technologies, Inc., Chicago, IL (US)

( * ) Notice: Subject to any disclaimer, the term of this patent is extended or adjusted under 35 U.S.C. 154(b) by 154 days.

(21) Appl. No.: 15/827,987

(22) Filed: Nov. 30, 2017

(51) Int. Cl.
*G06F 11/07* (2006.01)
*G06F 11/34* (2006.01)
*G06F 11/14* (2006.01)

(52) U.S. Cl.
CPC ........ *G06F 11/079* (2013.01); *G06F 11/0793* (2013.01); *G06F 11/3447* (2013.01); *G06F 11/1476* (2013.01)

(58) Field of Classification Search
CPC ............... G06F 11/079; G06F 11/0793; G06F 11/1476; G06F 11/3404; G06F 11/3409; G06F 11/3447–11/3457
USPC ........................................... 714/26, 37, 47.1
See application file for complete search history.

(56) References Cited

U.S. PATENT DOCUMENTS

| | | | |
|---|---|---|---|
| 5,566,092 A | 10/1996 | Wang et al. | |
| 5,633,800 A | 5/1997 | Bankert et al. | |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |

(Continued)

FOREIGN PATENT DOCUMENTS

| | | |
|---|---|---|
| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Joseph R Kudirka
(74) *Attorney, Agent, or Firm* — Lee Sullivan Shea & Smith LLP

(57) ABSTRACT

A computing platform may obtain observed data vectors related to the operation of a topology of nodes that represents a software application running on an uncontrolled platform, wherein each observed data vector comprises data values captured for a given set of operating variables at a particular point in time. After obtaining the observed data vectors, the computing platform may apply an anomaly detection model to the observed data vectors and then based on the anomaly detection model, may identify an anomaly in at least one operating variable. In turn, the computing platform may determine whether each identified anomaly is indicative of a problem related to the application, and based on a determination that an identified anomaly is indicative of a problem related to the software application, cause a client station to present a notification.

20 Claims, 4 Drawing Sheets

(56) References Cited

U.S. PATENT DOCUMENTS

| | | |
|---|---|---|
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,504,876 B2* | 8/2013 | Mork .................. G06F 16/2453 714/37 |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 9,092,561 B2* | 7/2015 | Miao .................. G06F 11/3608 |
| 10,102,055 B1* | 10/2018 | Gaber .................. G06F 11/079 |
| 10,255,124 B1* | 4/2019 | Bellingan .......... G06F 11/0709 |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2014/0372347 A1* | 12/2014 | Cohen ................. G06F 11/0709 706/12 |
| 2015/0046870 A1 | 2/2015 | Goldenberg et al. |
| 2015/0262060 A1 | 9/2015 | Husain et al. |
| 2016/0218949 A1* | 7/2016 | Dasgupta ............ H04L 63/1416 |
| 2016/0246691 A1* | 8/2016 | Clarke ................. G06F 11/1474 |
| 2018/0060703 A1* | 3/2018 | Fineis .................. G06K 9/6284 |
| 2019/0122138 A1* | 4/2019 | Li ............................ G06N 5/04 |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Infor M3 Enterprise Management System, Infor.com (2014).

Infor Equipment, Infor.com (2012).

Infor Introduces Next-Generation Solution for Equipment Dealers and Service Providers, Inforcom (Feb. 20, 2014).

Infor Equipment for Rental, Inforcom (2013).

Waltermire et al, Applying the Continuous Monitoring Technical Reference Model to the Asset, Configuration, and Vulnerability Management Domains (DRAFT), NIST (Jan. 2012).

Du et al. "Software Aging Estimation and Prediction of a Real VOD System Based on PCA and Neural Networks" 2009 IEEE Interna-

(56) References Cited

OTHER PUBLICATIONS tional Conference on Information and Automation Jun. 22-25, 2009, Zhuhai/Macau, China, pp. 111-116.

Du et al. "Software Aging Prediction based on Extreme Learning Machine." Telkomnika, vol. 11, No. 11, Nov. 2013, pp. 6547-6555.

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1.113.9295&rep=rep1&type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.

Infor M3 Enterprise Management System. Datasheet [online]. Infor, 2014 [retrieved May 19, 2015]. Retrieved from the Internet: <URL:www.inforcom.html>.

Infor Equipment. Datasheet [online]. Infor, 2012 [retrieved May 19, 2015]. Retrieved from the Internet:<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.

Infor Equipment for Rental. Datasheet [online] Infor, 2013 [retrieved May 19, 2015]. Retrieved from the Internet:<URL:www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

DeCelles et al. "Detecting Incipient Faults in Software Systems: A Compressed Sampling-based Approach" 2016 IEEE 9th International Conference on Cloud Computing, Electrical and Computer Engineering Department, Drexel University, DOI 10.1109/CLOUD.2016.46, Jan. 19, 2017, pp. 303-310 [online], [retrieved on Sep. 13, 2017] Retrieved from the Internext <URL: https://ieeexplore.ieee.org/document/7820285>.

Cotroneo et al. "Software Aging Analysis of the Linux Operating System" Department of Information and Science, Universita degli Studi di Napoli Frederico II, Nov. 11, 2010, 10 pages [online], [retrieved on Sep. 13, 2017] Retrieved from the Internet <URL:https://ieeexplore.ieee.org/document/5635122>.

Yu Song and Xinhing Wang. "Research on Application of Software Defect Analysis based on PCA." 2010 3rd International Conference on Advanced Computer Theory and Engineering, Sep. 20, 2010, pp. V4-373-VA-376 [online], [retrieved on Sep. 13, 2017] Retrieved from the Internet <URL:https://ieeexplore.ieee.org/document/5579464>.

\* cited by examiner

SYSTEMS AND METHODS FOR DETECTING AND REMEDYING SOFTWARE ANOMALIES

BACKGROUND

As technology progresses, it is becoming increasingly common for software applications to be provided to users according to a Software as a Service (SaaS) model where software applications are hosted at a central computing platform and accessed by a user via the Internet, as opposed to a traditional software model where software applications are installed directly onto a user's computer. Software applications that are provided according to a SaaS model may sometimes be referred to as on-demand software, web-based software, or hosted software.

When the SaaS model first emerged, software providers typically hosted their on-demand software in a physical computing infrastructure (e.g., servers, storage devices, network infrastructure, etc.) that was owned and operated by the software providers themselves. However, it is now becoming increasingly common for software providers to host their on-demand software in an Internet Area Network (IAN), such as a public, private, or hybrid cloud, that is owned and operated by a third-party provider. One well-known provider of IANs is Amazon Web Services (AWS), which offers on-demand hardware resources that can be used by software providers to host their on-demand software.

For a software provider, there are several benefits to hosting on-demand software in an IAN provided by a third party, rather than in a physical computing infrastructure owned and operated by the software provider. For instance, by using an IAN provided by a third party, a software provider can avoid the need to purchase, manage, and support its own physical computing infrastructure. Relatedly, when a software provider uses an IAN provided by a third party, hardware resources (e.g., compute resources, storage space, etc.) may be dynamically assigned to the software provider on an as-needed basis rather than being preassigned to the software provider in a dedicated manner, which typically reduces cost for the software provider and leads to a more efficient use of such resources overall.

Overview

While hosting software applications in an IAN offers many benefits, there are also some challenges associated with hosting software applications in an IAN. One such challenge is that, when a software application is hosted in an IAN, it can be difficult for a software provider to diagnose the root cause of a problem that occurs while the software application is running, such as a software crash or the like. This is primarily because the specific hardware resources on which the software application is running are owned and operated by a third-party provider and are typically assigned to the software provider dynamically (i.e., on an as-needed basis), which means that the software provider has limited information regarding the hardware resources that are running the software application at any given time. This lack of information regarding the hardware resources running the software application at the time that a software problem occurs make it difficult for a software provider to determine whether that software problem was caused by an anomaly in the software application itself (e.g., a software bug or other issue caused by software aging) or whether the software problem was caused by an issue with the hardware resources that were running the software application at the time the problem occurred (e.g., a malfunctioning server).

To help address this issue, disclosed herein is a technique for detecting anomalies in a software application that is running on a computing platform that is not controlled by the provider of the software application (e.g., an IAN provided by a third party such as AWS), which may be referred to herein as an "uncontrolled platform." In practice, the disclosed technique may be carried out by a computing platform that is controlled by the software provider, which may be referred to as a "controlled platform," but it should be understood that the disclosed technique may be carried out by various other systems or devices as well.

In accordance with the disclosed technique, a given software application may be represented as a topology of nodes, where each node comprises a self-contained component of a software application. In general, there may be at least three different types of nodes that can be included in such a topology: (1) a "source node," which is a node in the software application that receives data from a source that is external to the given software application and then passes the data to one or more downstream nodes in the topology, (2) a "processor node," which is a node that receives data from one or more upstream nodes, performs one or more processing operations on the data, and then passes the resulting data to one or more downstream nodes in the topology, and (3) a "sink node," which receives data from one or more upstream nodes and then makes the data available to other software applications that are external to the given software application. In practice, a downstream node in such a topology may receive data from an upstream node as a result of "subscribing" to the upstream node's data output. However, the topology of nodes that represents the given software application may take various other forms as well. (While the disclosed technique is described below in the context of a single software application, it should be understood that two or more interconnected software applications may be represented as a single topology of nodes, and in this respect, the disclosed technique may be used to detect anomalies across two or more interconnected software applications as well).

While the given software application is running, data then flows between and among the nodes in the topology representing the given software application. To evaluate the operation of the given software application, one or more different types of metrics related to the operation of the nodes in the given software application's topology may then be captured. These types of metrics may take various forms.

As a first example, the types of metrics captured for the given software application's topology may include cache-related metrics, such as the percentage of cache memory usage and/or the percentage of unused cache. As a second example, the types of metrics captured for the given software application's topology may include cluster-related metrics, such as consumer offset lag, number of offline cluster nodes, number of healthy dependencies, number of retries during recovery, and/or number of unhealthy tasks. As a third example, the types of metrics captured for the given software application's topology may include virtual-machine metrics, such as virtual machine RAM/memory usage and/or virtual machine CPU/GPU usage. A given node or software application may query the virtual machine, such as a hypervisor or a programming language virtual machine, via an API (Application Programming Interface) to obtain the virtual-machine metrics, as one possibility. As a fourth example, the types of metrics captured for the given software application's topology may include user-interface metrics, such as user input validation failure and/or number of user requests waiting in a queue (e.g. for processing by the software application). As a fifth example, the types of metrics captured for the given software application's topology may include database-query-related metrics, such as a number of pending/executing queries, query running time, records processing time, query CPU/memory usage, number of query results, and/or number of outputs persisted/written to a database. As a sixth example, the types of metrics captured for the given software application's topology may include failure-type metrics, such as data replication failure, task backup failure, task execution exception, invalid output exception, and/or invalid input exception. As a seventh example, the types of metrics captured for the given software application's topology may include software-lifecycle metrics, such as healthy/unhealthy session length, crashes, successful/unsuccessful launches, and/or monthly/daily engaged users. As an eighth example, the types of metric captured for the given software application's topology may include application-created metrics. For instance, a given node of a software application may include specific logic to generate and/or capture metrics associated with the application's performance behavior such as a counter that tracks a number of transactions that the given node has processed or that increments when the given node receives an incoming data sample. The application-created metric capturing may be customizable and may enable the capture of more detailed and application-specific metric data as compared to a traditional dedicated or controlled server, which may only capture certain built-in metrics. The given set of metrics related to the operation of the nodes in the topology that represents the given software application may take other forms as well.

In practice, a given type of metric may be captured for each node in the given software application's topology (or at least a given subset of the nodes). For example, if the metrics to be captured for the given software application's topology include a cache-related metric, then that cache-related metric may be captured for each node in the given software application's topology. In this respect, the metric as captured for each different node may be considered a separate operating variable for the given software application's topology. In other words, if the given software application's topology includes 5 nodes and a single type of metric is captured for those 5 nodes (e.g., a cache-related metric represented as "C"), then there may be a total of 5 operating variables for the given software application's topology (e.g., $C_1$, $C_2$, $C_3$, $C_4$, $C_5$). Similarly, if the given software application's topology includes 5 nodes and two types of metrics are captured for those 5 nodes (e.g., a cache-related metric represented as "C" and a virtual-machine metric represented as "V"), then there may be a total of 10 operating variables for the given software application's topology (e.g., $C_1$, $C_2$, $C_3$, $C_4$, $C_5$, $V_1$, $V_2$, $V_3$, $V_4$, $V_5$). The operating data variables for the given software application's topology may take various other forms as well.

In accordance with the disclosed technique, a given set of operating data variables for the given software application's topology may be selected for use in evaluating the operation of the given software application. Once the given set of operating variables are selected, an anomaly detection model that is based on a unsupervised machine learning technique may be applied to data values that are captured for the given set of operating variables while an instance of the given software application is running in an uncontrolled platform, in order to detect anomalies in the given software application's topology. This process may be carried out in various manners.

According to an example embodiment, the disclosed process may begin with a "training phase" (or "test phase") during which the given software application is run on the software provider's controlled platform and is used in a manner that is intended to simulate normal operation of the given software application (e.g., a set of common use cases). While running the given software application, the software provider's controlled platform then captures values for the given set of operating values at various points in time, thereby producing a time-sequence of multivariate data vectors where each multivariate data vector in the sequence comprises a snapshot of the values captured for the given set of operating variables at a particular point in time. In turn, the controlled platform may compile a subset of the captured multivariate data vectors into a set of training data vectors that are reflective of the normal operation of the given software application.

Depending on the form of unsupervised learning technique on which the anomaly detection model is based, the software provider's controlled platform may then perform certain pre-processing of the set of training data vectors. For instance, in one implementation, the anomaly detection model may be based on a component analysis technique such as Principal Component Analysis (PCA), which generally involves transformation of observed data vectors from their original "observed coordinate space" to a "transformed coordinate space" that is defined by variables that are uncorrelated from each other. In such an implementation, the training phase may involve applying a component analysis technique to the set of training data vectors to define a new "transformed coordinate space" for use in detecting anomalies in observed data.

For example, the training phase may involve applying a PCA technique to the set of training data vectors to define a new PCA coordinate space comprising a set of uncorrelated variables referred to as principal components (PCs), where the variance in the PCs "explains" the variance and covariance in the observed coordinate space. In this respect, the covariance of the multivariate data in the observed coordinate space may effectively be removed by transforming that data to a new set of PCs having no covariance. In addition, PCA may also order the variables of the PCA coordinate space in order of their variance, and may remove PC variables that do not have a large contribution based on their respective covariance. Depending on the component analysis technique used, the function of defining the transformed coordinate space may take other forms as well.

In addition to defining the transformed coordinate space for the component analysis technique, the training phase may also involve defining a set of anomaly thresholds for the anomaly detection model, which generally specify how much deviation from the predicted version of an observed data vector is acceptable in each dimension of the observed coordinator space (e.g., for each operating data variable). For instance, once the transformed coordinate space has been defined, the controlled platform may (1) transform (or "project") each training data vector from the observed coordinate space to the transformed coordinate space and then (2) inversely transform (or "project") each training data vector from the transformed coordinate space back to the observed coordinate space, thereby producing a predicted version of each training data vector. In turn, the controlled platform may evaluate the difference between the original and predicted versions of the training data vectors for each operating data variable in the observed coordinate space to define the acceptable deviation for each operating data variable.

In another implementation, the anomaly detection model may be based on linear regression. In such an implementation, the training phase may involve applying linear regression to the set of training data vectors to produce a predictive function that is representative of normal operation of the given software application, and then comparing each training data vector in the set to the predictive function to define a set of anomaly thresholds for the anomaly detection model (which generally specify how much deviation from the predicted function is acceptable for each operating data variable).

The anomaly detection approach may be based on other unsupervised learning techniques as well. It should also be understood that instead of performing these functions during a preliminary training phase, the controlled platform may perform one or more of these functions "on the fly" while evaluating observed data vectors. Other implementations are possible as well.

After the set of training data vectors has been compiled and the training phase has completed, the software provider's controlled platform may then engage in an "execution phase" during which the controlled platform may apply the anomaly detection model to observed data for an instance of the given software application that is running on an uncontrolled platform (e.g., an IAN such as a public, private, or hybrid cloud) to monitor for anomalies in the instance of the given software application.

For instance, the controlled platform may first obtain a set of observed data vectors that each comprise a snapshot of the values captured for the given set of operating variables at a particular point in time while the instance of the given software application is running on the uncontrolled platform. In turn, the controlled platform may apply the anomaly detection model to each such observed data vector to determine whether the data values for any of the operating data variables are anomalous. Depending on the form of unsupervised learning technique on which the anomaly detection model is based, this function may take various forms.

In line with the discussion above, in one implementation, the anomaly detection model may be based on a component analysis technique such as PCA. In such an implementation, applying the anomaly detection model may involve (1) transforming (or "projecting") each observed data vector from the observed coordinate space to the transformed coordinate space (e.g., the PCA space) and then (2) inversely transforming (or "projecting") each observed data vector from the transformed coordinate space back to the observed coordinate space, thereby producing a predicted version of each observation data vector that comprises an estimate of what the values of the observed data vector should have been had the given software application been operating normally.

According to this implementation, the controlled platform may then evaluate the predicted values of the observed data vectors as compared to the original values of the observed data vectors, to determine whether the deviation between the observed and predicted values of any operating variable exceeds the anomaly thresholds for the anomaly detection model.

In another implementation, the anomaly detection model may be based on linear regression. In such an implementation, applying the anomaly detection model may involve comparing the observed data vectors to a predictive function to determining whether the deviation between the observed and predicted values of any operating variable exceeds the anomaly thresholds for the anomaly detection model.

The function of applying the anomaly detection model to observed data for an instance of the given software application may take other forms as well.

As a result of applying the anomaly detection model, the software provider's controlled platform may identify an anomaly in one or more of the operating variables for the given software application, which may correspond to one or more nodes of the given software application's topology. Once the software provider's controlled platform identifies any such anomaly, the controlled platform may evaluate whether the root cause of the identified anomaly is likely a problem in the given software application (e.g., a bug), or instead, whether the root cause of the anomaly is likely some other problem that is unrelated to the given software application (e.g., a problem with the uncontrolled computing platform). This evaluation may take various forms.

As one possibility, after the controlled platform identifies an anomaly in an operating variable that corresponds to a given node of the given software application's topology, the controlled platform may then evaluate the operating variables corresponding to other nodes in the topology that share dependencies with the given node, such as the given node's child nodes and/or sibling nodes. If the operating data variables corresponding to these other nodes appear to be normal (i.e., non-anomalous), then the controlled platform may determine that the root cause of the anomaly is likely a problem with the given node in the given software application. On the other hand, if at least some of the operating data variables corresponding to these other nodes are also anomalous, then the controlled platform may determine that the root cause of the anomaly is likely a problem that is unrelated to the given software application.

As another possibility, after the controlled platform identifies an anomaly in an at least one operating variable for the given software application, the controlled platform may then re-run the given software application on the controlled platform under the same conditions that led to the anomaly being identified (e.g., by inputting the same source data into the given software application). In this respect, the controlled platform may attempt to replicate the anomalous operation of the given software application each time an anomaly is identified in the instance of the given software application running on the uncontrolled platform, or alternatively, may attempt to replicate the anomalous operation of the given software application only after first performing some other root cause analysis of the identified anomaly (e.g., by evaluating other nodes that share dependencies with an anomalous node). In either case, if a similar anomaly is identified after re-running the given software application on the controlled platform under the same conditions that gave rise to the anomaly at the uncontrolled platform, the controlled platform may determine that the root cause of the anomaly is likely a problem with the given software application (and in particular, with the node that corresponds to the operating variable exhibiting the anomaly). On the other hand, if no anomaly is identified after re-running the given software application on the controlled platform under the same conditions that gave rise to the anomaly at the uncontrolled platform, the controlled platform may determine that the root cause of the anomaly is likely a problem that is unrelated to the given software application.

The controlled platform's evaluation of the likely root cause of an identified anomaly may take various other forms as well.

Once the controlled platform determines the likely root cause of an identified anomaly in the given software application, this determination may trigger the controlled platform to take various one or more remedial actions, which may take various forms.

For instance, if the controlled platform determines that the root cause of the anomaly is likely a problem with the given software application, the controlled platform may cause a notification to be provided to an individual responsible for developing and/or testing the given software application, such as a quality assurance engineer. This notification may take various forms. In one example, the notification may include an identification of the given software application for which an anomaly has been identified and perhaps also an identification of the particular node(s) in the given software application's topology that correspond to the identified anomaly. The notification may include other information and take other forms as well. Further, the controlled platform may cause a notification to be provided in various manners. As one example, the controlled platform may transmit the notification to a client station associated with an individual responsible for developing and/or testing the given software application, which may in turn present the notification to the individual.

Once the individual responsible for developing and/or testing the given software application receives this notification, the individual may then conduct further evaluation of the issue to determine if there is indeed a problem with the given software application.

On the other hand, if the controlled platform determines that the root cause of the anomaly is likely a problem unrelated to the given software application, the controlled platform may cause the uncontrolled platform to re-run the given software application (e.g., by sending an instruction to the uncontrolled platform).

Based on its determination of the likely root cause of an identified anomaly in the given software application, the controlled platform may take various other remedial actions as well.

One of ordinary skill in the art will appreciate these as well as numerous other aspects in reading the following disclosure.

Accordingly, in one aspect, disclosed herein is a method for identifying anomalies that involves: (a) obtaining observed data vectors related to the operation of a topology of nodes that represents a given software application running on an uncontrolled platform, wherein each observed data vector comprises data values captured for a given set of operating variables at a particular point in time, (b) applying an anomaly detection model to the obtained observed data vectors, wherein the anomaly detection model is based on an unsupervised learning technique that is used to evaluate whether the deviation between observed and predicted values for each operating variable of the given set of operating variables is indicative of an anomaly, (c) based on the anomaly detection model, identify an anomaly in at least one operating variable in the given set of operating variables, (d) determine whether each identified anomaly is indicative of a problem related to the given software application, and (e) based on a determination that an identified anomaly is indicative of a problem related to the given software application, cause a client station to present a notification indicating the identified anomaly.

In another aspect, disclosed herein is a computing platform comprising a network interface, at least one processor, a non-transitory computer-readable medium, and program instructions stored on the non-transitory computer-readable medium that are executable by the at least one processor to cause the computing system to carry out functions associated with the disclosed method for detecting anomalies.

In yet another aspect, disclosed herein is a non-transitory computer-readable medium having instructions stored thereon that are executable to cause a computing system to carry out functions associated with the disclosed system for detecting anomalies.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
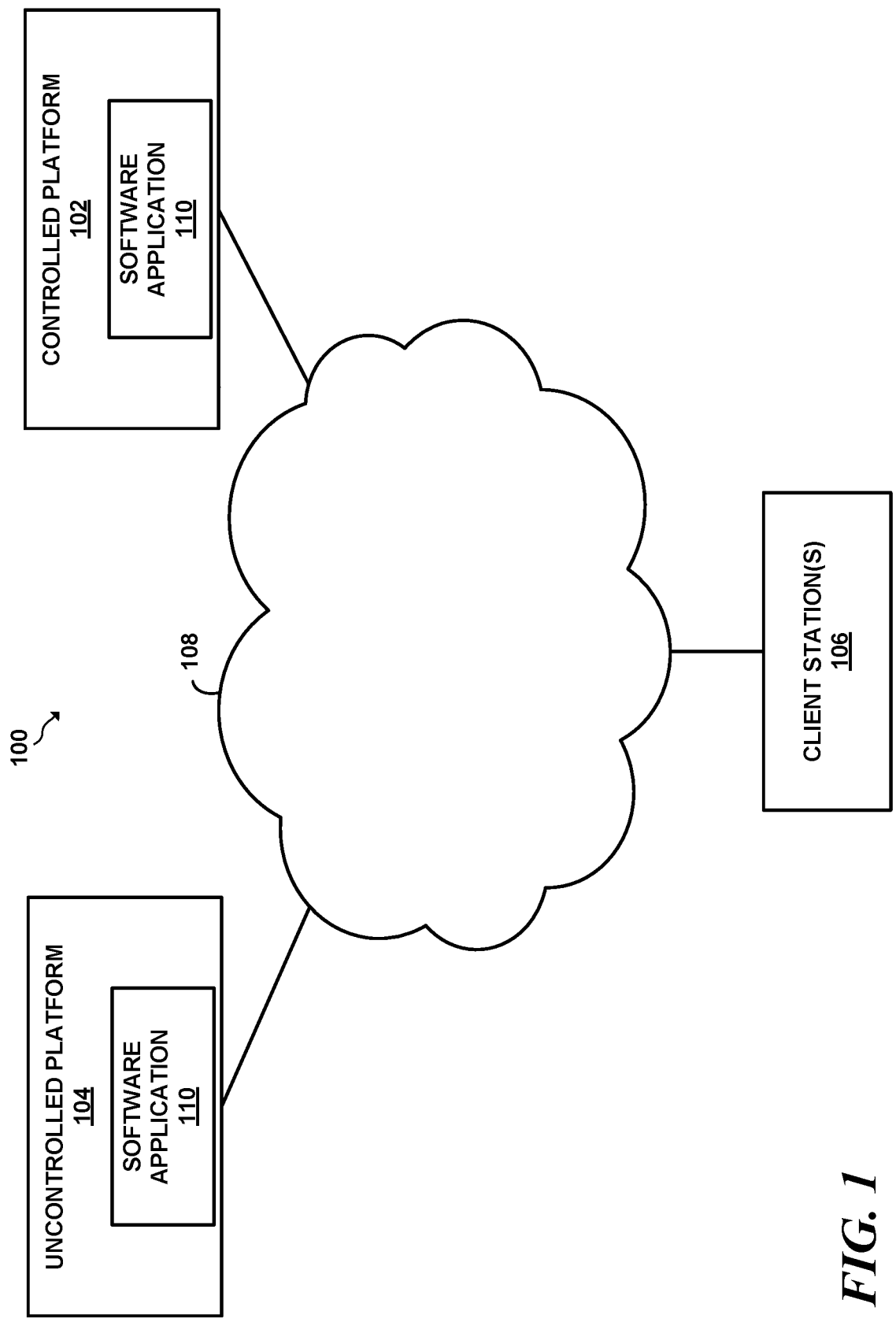
FIG. 1 depicts an example network configuration in which example embodiments may be implemented.

Turning now to the figures, FIG. 1 depicts an example network configuration 100 in which example embodiments may be implemented. As shown, the network configuration 100 includes a controlled platform 102, an uncontrolled platform 104, and a plurality of client stations, such as representative client station 106, all of which may be communicatively coupled via a communication network 108 or the like. It should be understood that the network configuration may include various other entities as well.

In general, controlled platform 102 may be any computing platform that is under the control of a given software provider. Broadly speaking, such a computing platform may take the form of one or more computer systems that are configured to carry out one or more functions related to the disclosed process for detecting anomalies in a given software application that has been developed by the given software provider, such as software application 110. For instance, controlled platform 102 may include one or more servers (or the like) having hardware components and software components that are configured to carry out one or more functions related to the disclosed process for detecting anomalies in software application 110. Further, controlled platform 102 may include one or more user interface components that enable a platform user to interface with the platform. Further yet, controlled platform 102 may be arranged to receive and transmit data according to dataflow technology, such as TPL Dataflow or NiFi, among other examples.

In practice, the one or more computing systems that make up controlled platform 102 may be located in a single physical location or may be distributed amongst a plurality of locations, and may be communicatively linked via a system bus, a communication network (e.g., a private network), or some other connection mechanism. In this respect, controlled platform 102 may be located at least partially on premises (e.g. datacenters, server rooms, etc.) that are under the control of the software provider, and/or are at least physically accessible to the software provider, such as a server room under control of the software provider, a datacenter owned by the software provider, and/or a datacenter owned by a hosting provider that offers co-location. Further, controlled platform 102 could comprise dedicated physical servers that are under the control of a software provider and/or virtual private servers (VPSs), which are physical servers owned by a hosting provider and may be leased by a software provider for purposes of running virtual machines. Controlled platform 102 may take various other forms as well.

In turn, uncontrolled platform 104 may be any computing platform that is not under the control of the provider of the given software application 110, but is nevertheless configured to run instances of software application 110. Broadly speaking, such a computing platform may take the form of any one or more computer systems that are configured to run instances of software application 110 and carry out one or more other functions related to the disclosed process for detecting anomalies in software application 110 (e.g., providing operating data for software application 110 to controlled platform 102). For instance, uncontrolled platform 104 may include one or more servers (or the like) having hardware components and software components that are configured to carry out one or more of the functions disclosed herein for running instances of software application 110 and also potentially carrying out one or more other functions related to the disclosed process for detecting anomalies in software application 110. Further, uncontrolled platform 104 may include one or more user interface components that enable a platform user to interface with the platform. Further yet, uncontrolled platform 104 may be arranged to receive and transmit data according to dataflow technology, such as TPL Dataflow or NiFi, among other examples.

In practice, the one or more computing systems that make up uncontrolled platform 104 may be located in a single physical location or distributed amongst a plurality of locations, and may be communicatively linked via a system bus, a communication network (e.g., a private network), or some other connection mechanism. In one particular implementation, uncontrolled platform 104 may comprise the computing infrastructure of an Internet Area Network (IAN), such as a public, private, or hybrid cloud), and this owned and operated by a third-party provider of on-demand hardware resources (e.g. storage, processing, virtual machines, etc.) that can be used by software providers to host software (e.g., Amazon Web Services (AWS)). In another implementation, uncontrolled platform 104 may comprise one or more dedicated servers, VPSs, or the like that are configured to run instances of software application 110. Uncontrolled platform 104 may take other forms as well.

Referring again to FIG. 1, client station 106 may take the form of a computing system and/or device that enables a user to interact with controlled platform 102 and/or uncontrolled platform 104. To facilitate this, client station 106 may include hardware components such as a user interface, a network interface, a processor, and data storage, among other components. Additionally, client station 106 may be configured with software components that enable interaction with controlled platform 102 and/or uncontrolled platform 104 via a graphical user interface or the like, such as a web browser that is capable of accessing software application 110 or a native client application associated with controlled platform 102 and/or uncontrolled platform 104, among other examples. Representative examples of client stations may include a desktop computer, a laptop, a netbook, a tablet, a smartphone, a personal digital assistant (PDA), or any other such device now known or later developed.

As discussed above, controlled platform 102, controlled platform 104, and client station 106 may be communicatively coupled via communication network 108, which may generally include one or more computing systems, network infrastructure, and/or communication links that are configured to facilitate transferring data between these computing systems and/or devices. In practice, communication network 108 may be or may include one or more IANs (such as public, private, or hybrid clouds), Wide-Area Networks (WANs) (such as the Internet or a cellular network, Local-Area Networks (LANs), and/or dedicated communication links, which may be wired and/or wireless and may support secure and reliable communication. Further, communication network 108 may operate according to one or more communication protocols, such as LTE (Long Term Evolution), CDMA (Carrier Division Multiple Access), GSM, LPWAN, WiFi (e.g. the 802.11x family of protocols from the Institute of Electrical and Electronics Engineers (IEEE), Bluetooth, Fibre Channel, Ethernet (e.g. the IEEE 802.3x family of standards), WDM (Wavelength Division Multiplexing), HTTP/S (Secure/Hypertext Transport Protocol), TLS (Transport Level Security), TCP (Transmission Control Protocol), UDP (Universal Datagram Protocol), ATM, FDDI, CoAP (Constrained Application Protocol)/DTLS (datagram Transport Layer Security), and/or the like. Communication network 108 may include other types of networks and/or operate according to other communication protocols as well.

Although communication network 108 is shown as a single network, it should be understood the communication network 108 may include multiple, distinct networks that are themselves communicatively linked. Further, although not shown, the communication path between controlled platform 102, uncontrolled platform 104, and/or client station 106 may include one or more intermediate devices. Many other configurations are also possible.

In this configuration, the given software provider may use controlled platform 102 to develop and test software application 110, and may then deploy software application 110 to uncontrolled platform 104 for execution, such that uncontrolled platform 104 serves as the production environment for software application 110. As described in further detail below, controlled platform 102 may then monitor instances of software application 110 running on uncontrolled platform 104 (e.g., based on operating data received from uncontrolled platform 104) to determine whether there are any anomalies in the given software application 110 that need to be remedied.

It should be understood that the network configuration 100 is one example of a network in which embodiments described herein may be implemented. Numerous other arrangements are possible and contemplated herein. For instance, other network configurations may include additional components not pictured and/or more or fewer of the pictured components.

II. EXAMPLE COMPUTING PLATFORM

Figure 2:
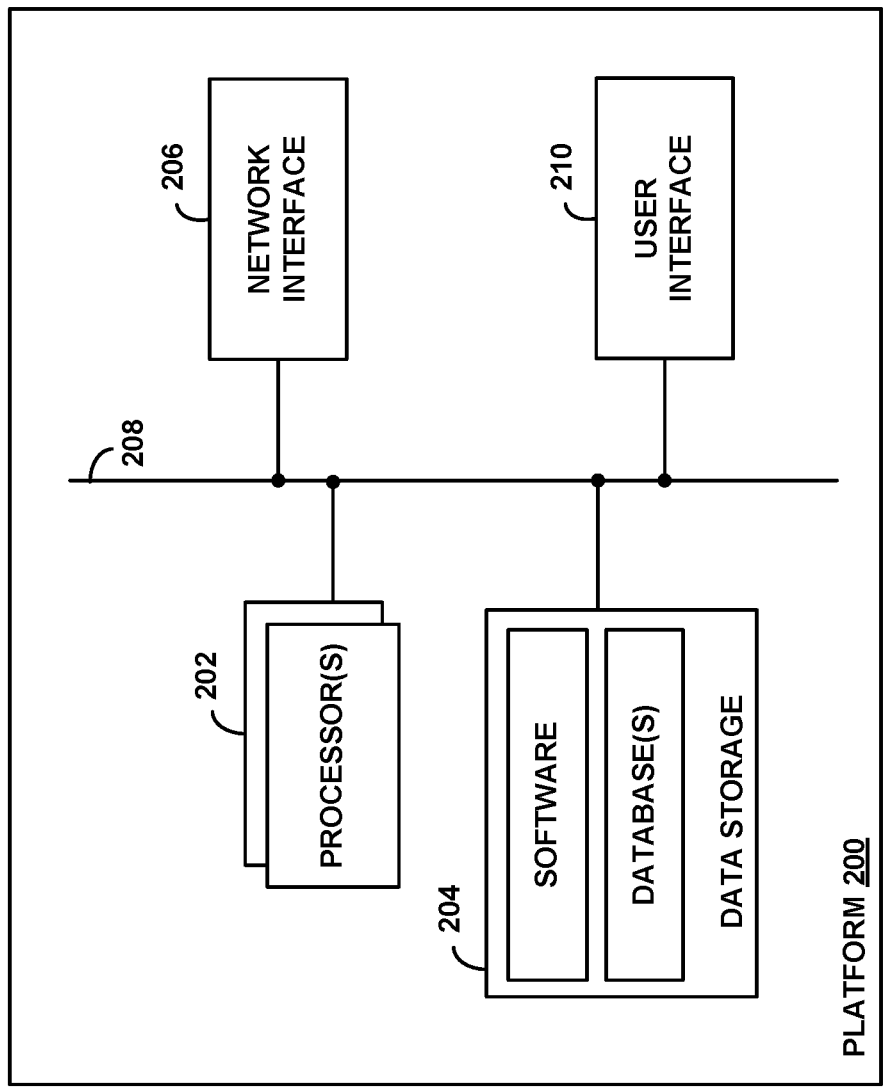
FIG. 2 illustrates components that may be included in an example computing platform.

FIG. 2 is a simplified block diagram illustrating some components that may be included in an example computing platform 200 from a structural perspective, which could serve as a controlled platform (e.g. controlled platform 102) or an uncontrolled platform (e.g. uncontrolled platform 104). In line with the discussion above, platform 200 may generally comprise one or more computer systems (e.g., one or more servers), and these one or more computer systems may collectively include at least a processor 202, data storage 204, network interface 206, and perhaps also a user interface 210, all of which may be communicatively linked by a communication link 208 that may take the form of a system bus, communication network such as an IAN (e.g., a public, private, or hybrid cloud), or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of an IAN (e.g., a public, private, or hybrid cloud).

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of an IAN (e.g., a public, private, or hybrid cloud) that operates according to technology such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like. For instance, in accordance with the present disclosure, data storage 204 may be provisioned with instances of the given software application 110 as well as software components related to the disclosed process for detecting anomalies in software application 110.

Further, data storage 204 may be arranged to store data related to the functions carried out by platform 200 (e.g., operating data for the given software application 110) in a database or the like. In one implementation, the data storage 204 may store data using a broadly-distributable and highly-scalable multi-node technology such as Elasticsearch and/or MongoDB shards. However, the data storage 204 may store data in other manners as well.

Network interface 206 may be configured to facilitate wireless and/or wired communication between platform 200 and various network components coupled to communication network 108, such as another computing platform and/or a client station. Additionally, in an implementation where platform 200 comprises a plurality of physical computing devices connected via a network, network interface 206 may be configured to facilitate wireless and/or wired communication between these physical computing devices (e.g., between computing and storage clusters in an IAN). As such, network interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 206 may also include multiple network interfaces that support various different types of network connections, some examples of which may include Hadoop, FTP, relational databases, high frequency data such as OSI PI, batch data such as WL, and Base62. Other configurations are possible as well.

In some embodiments, platform 200 may additionally include one or more physical interfaces 210 that facilitate user interaction with platform 200. For example, the platform's one or more physical interfaces may take the form of ports, short-range wireless transceivers, or the like that provide connectivity with external user-interface equipment (sometimes referred to as "peripherals") such as a keyboard, a mouse or trackpad, a display screen, a touch-sensitive interface, a stylus, a virtual-reality headset, speakers, etc. As another example, the platform's one or more physical interfaces may take the form of user-interface components that are physically integrated into platform 200, such as an integrated keyboard, trackpad, display screen, and/or a touch-sensitive interface. The platform's one or more physical interfaces may take other forms as well.

It should also be understood that, instead of interacting with the computing system 200 via physical interface(s) 210, a user may interact with the computing system 200 via a client station that is communicatively coupled to the computing system 200 via a communication network and the computing system's network interface 206.

In either case, platform 200 may provide a user with a graphical user interface (GUI) that enables the user to perform administration functions for platform 200 (e.g., functions for managing and monitoring a cloud infrastructure).

III. EXAMPLE TOPOLOGY OF A SOFTWARE APPLICATION

As discussed above, a given software application may be represented as a topology of nodes, where each node comprises a self-contained component of a software application. Examples of such a self-contained component may comprise a thread, process, a container (e.g., a Docker container or similar), or any combination thereof. The component represented by a given node may take various other forms as well.

The topology of nodes that represents a given software application may take various forms. As one possibility, the topology of nodes may comprise a hierarchical tree-like structure, but other configurations are possible as well. While the given software application is running, data may then flow between and among the nodes in the topology representing the given software application. More particularly, data may flow from upstream nodes, which are located at higher levels of the hierarchy, to downstream nodes, which are located at lower levels of the hierarchy.

In general, there may be at least three different types of nodes that can be included in such a topology: (1) a "source node," which is a node in the software application that receives data from a source that is external to the given software application and then passes the data to one or more downstream nodes in the topology, (2) a "processor node," which is a node that receives data from one or more upstream nodes, performs one or more processing operations on the data, and then passes the resulting data to one or more downstream nodes in the topology, and (3) a "sink node," which receives data from one or more upstream nodes and then makes the data available to other software applications that are external to the given software application. In practice, a downstream node in such a topology may receive data from an upstream node as a result of "subscribing" to the upstream node's data output. However, the topology of nodes that represents the given software application may take various other forms as well. (While the disclosed technique is described below in the context of a single software application, it should be understood that two or more interconnected software applications may be represented as a single topology of nodes, and in this respect, the disclosed technique may be used to detect anomalies across two or more interconnected software applications as well).

An example topology of nodes 300 that represents a given software application will now be described with reference FIG. 3. For purposes of illustration, this topology will be described with reference to software application 110 described above in connection with FIG. 1.

Figure 3:
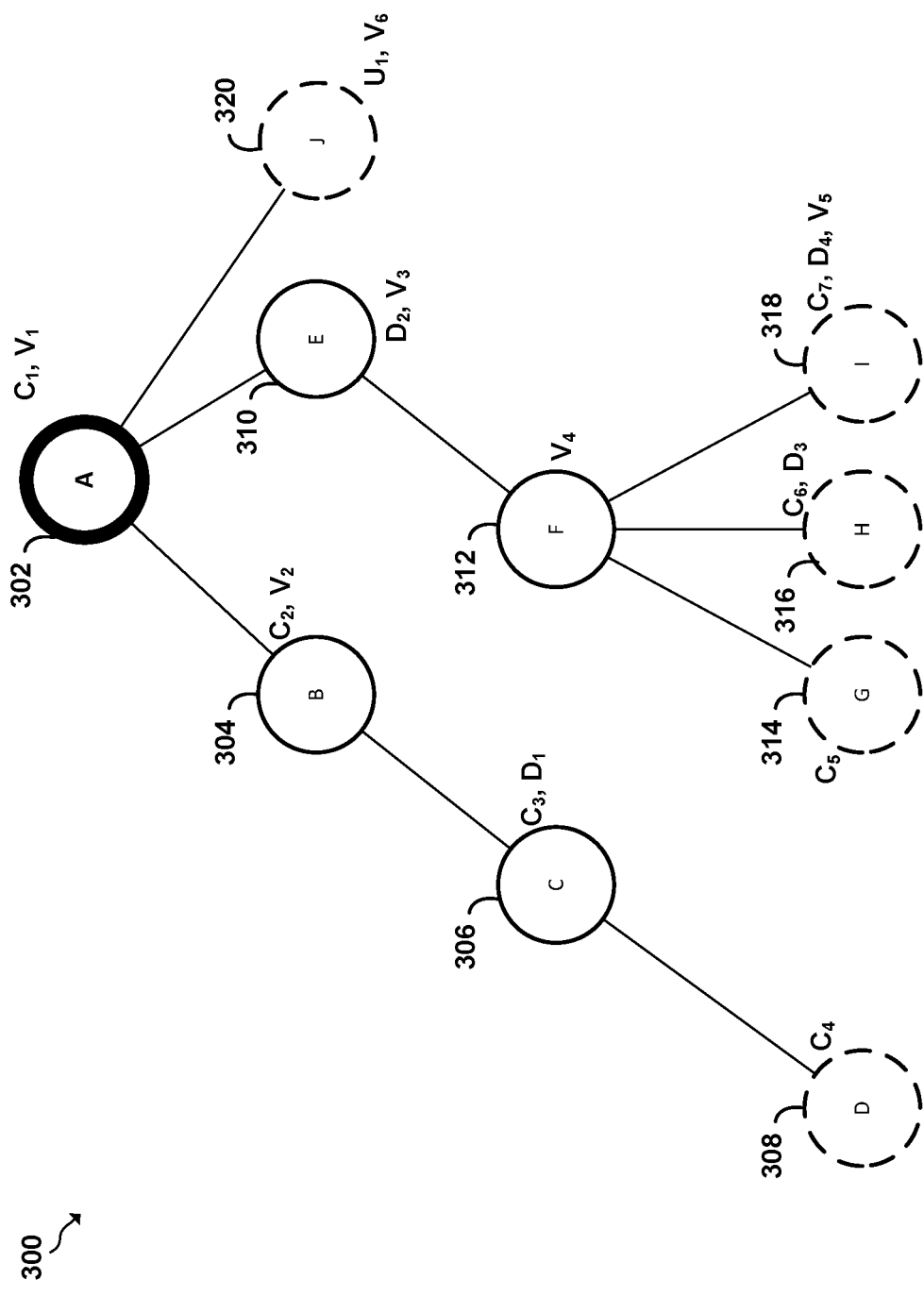
FIG. 3 is an illustration of an example topology of nodes that represents a given software application.

As shown in FIG. 3, example topology 300 may comprise a hierarchical structure of nodes that includes a source node 302, 304, 306, 308, 310, 312, 314, 316, 318, and 320. Each node is connected to at least one other node via a link (which may be referred as an "edge" in graph theory). For example, node A (302) is connected to node B (304) via a first link, and node A is connected to node E (310) and node J (320) via second and third links, respectively.

In topology 300, a source node is indicated by a solid bold border, a processor node is indicated by a solid (non-bold) border, and a sink node is indicated by a dashed border. Thus, as shown, node A (302) is a source node, nodes B (304), C (306), E (310), and F (312) are processor nodes, and nodes D (308), G (314), H (316), I (318), and J (320) are sink nodes.

Additionally, as shown, each node may belong to a given level of the hierarchy of topology 300. For instance, node 302 is at the highest (i.e., first) level of the hierarchy, nodes B (304), E (310), and J (320) belong to the next highest (i.e., second) level of the hierarchy, nodes C (306) and F (312) belong to next highest (i.e., third) level of the hierarchy, and then lastly, nodes D (308), G (314), H (316), and I (318) belong to the lowest (i.e., fourth) level of the hierarchy. In topology 300, data generally flows from upstream to downstream nodes based on the level of the hierarchy to which each node belongs, where node A is the upstream-most node and nodes D, G, H, and I are the downstream-most nodes.

An example data flow that may take place in topology 300 while software application 110 is being executed will now be described in greater detail. The example data flow may begin at source node A (302), which may receive input from various sources. Examples of such sources may comprise user input, file input, stream input, and may take various other forms as well. Source node A may ingest and process the received input, and may pass some or all of the ingested/processed input to its child nodes, i.e., processor node B (304), processor node E (310), and/or sink node J (320). Although only a single source node is illustrated in topology 300, it should be understood that a topology may have multiple source nodes and may take various other forms.

Responsive to receiving data from source node A (302), processor node B (304) may process the received data and may output processed data, to processor node C (306). Processor node C (306), responsive to receiving processed data from processor node B, may perform further processing, and output processed data to sink node D (308). Sink node D may process data received from node C, and may output the data to another software application.

Turning now to processor node E (310), processor node E receives data from source node A (302), processes some or all of the received data, and outputs the processed data to processor node F (312). Processor node F may perform additional processing and may output its processed data to sink nodes G (314), H (316), and I (318). Sink nodes G, H, and I, in turn may each process and output data to another software application.

Referring back to source node A (302), in addition to outputting data to processor nodes B (304) and E (310), source node A (302) may also output data to sink node J (320). Sink node J, in turn, may output data to another application.

To evaluate the operation of the given software application, one or more different types of metrics related to the operation of the nodes in the given software application's topology may be captured for each node as data flows through the given software application. These types of metrics may take various forms.

As a first example, the types of metrics captured for the given software application's topology may include cache-related metrics, such as the percentage of cache memory usage and/or the percentage of unused cache.

As a second example, the types of metrics captured for the given software application's topology may include cluster-related metrics, such as consumer offset lag, number of offline cluster nodes, number of healthy dependencies, number of retries during recovery, and/or number of unhealthy tasks.

As a third example, the types of metrics captured for the given software application's topology may include virtual-machine metrics, such as virtual machine RAM/memory usage and/or virtual machine CPU/GPU usage. A given node or software application may query the virtual machine, such as a hypervisor or a programming language virtual machine, via an API (Application Programming Interface) to obtain the virtual-machine metrics, as one possibility.

As a fourth example, the types of metrics captured for the given software application's topology may include user-interface metrics, such as user input validation failure and/or number of user requests waiting in the queue.

As a fifth example, the types of metrics captured for the given software application's topology may include database-query-related metrics, such as number of pending/executing queries, query running time, records processing time, query CPU/memory usage, number of query results, and/or number of outputs persisted/written to a database.

As a sixth example, the types of metrics captured for the given software application's topology may include failure-type metrics, such as data replication failure, task backup failure, task execution exception, invalid output exception, and/or invalid input exception.

As a seventh example, the types of metrics captured for the given software application's topology may include software-lifecycle metrics, such as healthy/unhealthy session length, crashes, successful/unsuccessful launches, and/or monthly/daily engaged users.

As an eighth example, the types of metric captured for the given software application's topology may include application-created metrics. For instance, a given node of a software application may include specific logic to generate and/or capture metrics associated with the application's performance behavior such as a counter that tracks a number of transactions that the given node has processed or that increments when the given node receives an incoming data sample. The application-created metric capturing may be customizable and may enable the capture of more detailed and application-specific metric data as compared to a traditional dedicated or controlled server, which may only capture certain built-in metrics.

The given set of metrics related to the operation of the nodes in the topology that represents the given software application may take other forms as well.

In practice, a given type of metric may be captured for each node in the given software application's topology (or at least a given subset of the nodes). For example, if the metrics to be captured for the given software application's topology include a cache-related metric, then that cache-related metric may be captured for each node in the given software application's topology. In this respect, the metric as captured for each different node may be considered a separate operating variable for the given software application's topology. In other words, if the given software application's topology includes 5 nodes and a single type of metric is captured for those 5 nodes (e.g., a cache-related metric represented as "C"), then there may be a total of 5 operating variables for the given software application's topology (e.g., $C_1$, $C_2$, $C_3$, $C_4$, $C_5$). Similarly, if the given software application's topology includes 5 nodes and two types of metrics are captured for those 5 nodes (e.g., a cache-related metric represented as "C" and a virtual-machine metric represented as "V"), then there may be a total of 10 operating variables for the given software application's topology (e.g., $C_1$, $C_2$, $C_3$, $C_4$, $C_5$, $V_1$, $V_2$, $V_3$, $V_4$, $V_5$). The operating data variables for the given software application's topology may take various other forms as well.

In the example of FIG. 3, there are variables shown next to the nodes in topology 300 to indicate some representative examples of metrics that may be captured for such nodes. For example, as shown in FIG. 3:

A first cache-related metric $C_1$ and a first virtual-machine metric $V_1$ may be captured for node A;
A second cache-related metric $C_2$ and a second virtual-machine metric $V_2$ may be captured for node B;
A third cache-related metric $C_3$ and a first database-query-related metric $D_1$ may be captured for node C;
A fourth cache-related metric $C_4$ may be captured for node D;
A third virtual-machine metric $V_3$ and a second database-query-related metric $D_2$ may be captured for node E;
A fourth virtual-machine metric $V_4$ may be captured for node F;
A fifth cache-related metric $C_5$ may be captured for node G;
A sixth cache-related metric $C_6$ and a third database-query-related metric $D_3$ may be captured for node H;
A seventh cache-related metric $C_7$, a fourth database-query-related metric $D_4$, and a fifth virtual-machine metric $V_5$ may be captured for node I; and
A first user-interface metric $U_1$ and a sixth virtual-machine metric $V_6$ may be captured for node J.

As described above, each metric captured for each node may be considered to be a separate operating variable, and the combination of captured operating variables may be collectively define a set of operating variables the given software application's topology. In the example illustrated in FIG. 3, the set of operating variables for topology 300 may comprise the following set of 18 operating variables: $\{C_1, C_2, C_3, C_4, C_5, C_6, C_7, V_1, V_2, V_3, V_4, V_5, V_6, D_1, D_2, D_3, D_4, U_1\}$, which may be represented as a vector. (While the example in FIG. 3 shows different types of metrics being captured for different nodes, it should be understood that the same types of metrics may be capture for each respective node in the topology).

In addition to capturing metrics at a node level, it is also possible that certain metrics may be captured for topology 300 as a whole. For instance, user-interface metrics, database-query-related metrics, etc. may be captured for topology 300 as a whole. In such an example, these topology-wide metrics may then also be included in the set of operating variables for topology 300. The operating variables for topology 300 may take various other forms as well.

While capturing data for one or more of the metrics discussed above, software application 110 may also output the captured metric data to a database or the like for persistence, so that controlled platform 102 may later access the captured metric data. In one possible implementation, the captured metric data may be reported (e.g. output) by each node of topology 300 to a software service that controls execution of software application 110, and the software service may in turn direct (i.e. output and/or commit) the reported captured metric data to a database for persistent storage. Thereafter, controlled platform 102 may query the database to retrieve the captured metric data (e.g., via a query interface). The captured metric data may be persisted and be made accessible to controlled platform 102 in various other manners as well.

The data values captured for a given set of operating variables for a given software application may then be used to carry out the disclosed process for detecting anomalies in the given software application's topology. This process may be carried out in various manners, and is described in greater detail with respect to FIG. 4 below.

IV. EXAMPLE OPERATIONS

As discussed above, disclosed herein is a process for detecting anomalies in a given software application running on an uncontrolled platform. In general, the disclosed process involves applying an anomaly detection model that is based on a unsupervised machine learning technique to data values that are captured for a given set of operating variables while an instance of the given software application is running in an uncontrolled platform, in order to detect anomalies in the given software application's topology.

Figure 4:
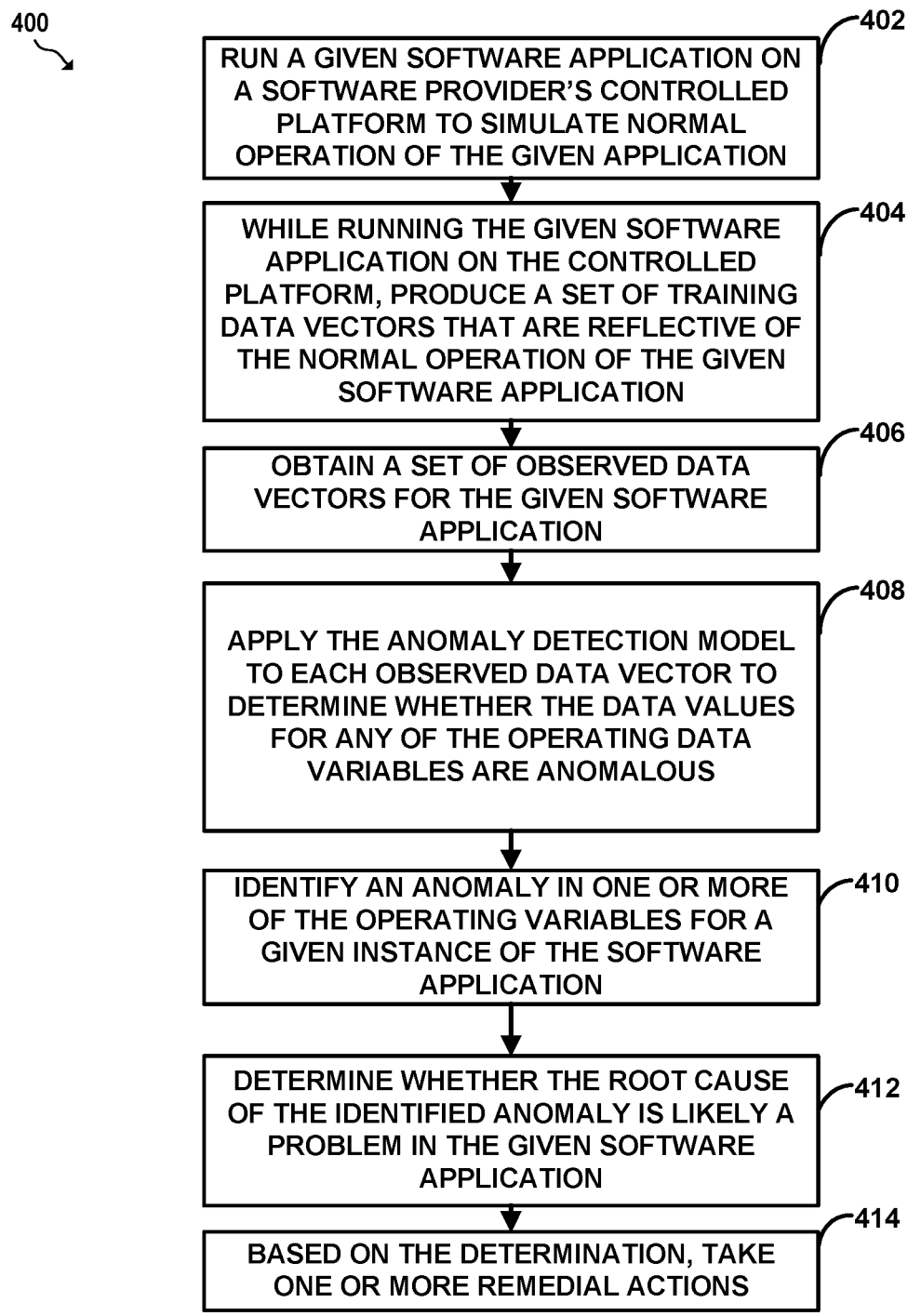
FIG. 4 is a flow diagram that depicts an example method of detecting and evaluating anomalies in a given software application.

An example of the disclosed process for detecting anomalies in a given software application running on an uncontrolled platform will now be described with reference to FIG. 4. In FIG. 4, each block may generally represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process.

For the purposes of illustration, the example functions are described as being carried out in the network configuration 100 illustrated in FIG. 1, where controlled platform 102 functions to monitor for and detect anomalies in an instance of software application 110 that is running on uncontrolled platform 104. However, it should be understood that the example functions may be carried out in various other network configurations as well. Likewise, it should be understood that the flow diagram in FIG. 4 is provided for sake of clarity and explanation and that numerous other combinations of functions may be utilized to detect anomalies in a given software application running on an uncontrolled platform—including the possibility that example functions may be added, removed, rearranged into different orders, combined into fewer blocks, and/or separated into additional blocks depending upon the particular embodiment.

At block 402, according to an example embodiment, the disclosed process may begin with a "training phase" during which an instance of software application 110 is run on controlled platform 102 and is used in a manner that is intended to simulate normal operation of the given software application (e.g., a set of common use cases). While running the given instance of software application 110, controlled platform 102 then captures values for a given set of operating values at various points in time, thereby producing a time-sequence of multivariate data vectors where each multivariate data vector in the sequence comprises a snapshot of the values captured for the given set of operating variables at a particular point in time.

In turn, at block 404, controlled platform 102 may compile a subset of the captured multivariate data vectors into a set of training data vectors that are reflective of the normal operation of software application 110.

Depending on the form of unsupervised learning technique on which the anomaly detection model is based, the software provider's controlled platform may then perform certain pre-processing of the set of training data vectors. For instance, in one implementation, the anomaly detection model may be based on a component analysis technique such as Principal Component Analysis (PCA), which generally involves transformation of observed data vectors from their original "observed coordinate space" to a "transformed coordinate space" that is defined by variables that are uncorrelated from each other. In such an implementation, the training phase may involve applying a component analysis technique to the set of training data vectors to define a new "transformed coordinate space" for use in detecting anomalies in observed data.

For example, the training phase may involve applying a PCA technique to the set of training data vectors to define a new PCA coordinate space comprising a set of uncorrelated variables referred to as principal components (PCs), where the variance in the PCs "explains" the variance and covariance in the observed coordinate space. In this respect, the covariance of the multivariate data in the observed coordinate space may effectively be removed by transforming that data to a new coordinate space based on the set of PCs having no covariance. In addition, PCA may also order the PCs of the PCA coordinate space in order of their covariance. Depending on the component analysis technique used, the function of defining the transformed coordinate space may take other forms as well.

After ranking the variables of the PCA coordinate space in order of their covariance, controlled platform 102 may also reduce the dimensionality of the transformed coordinate space by removing a number of PCs that have the lowest contribution, i.e. the lowest respective covariance. As some examples, controlled platform 102 may remove a PCs from the set if its respective covariance is less than a threshold level of covariance. Controlled platform 102 may determine PCs for removal in various other manners as well.

In addition to defining the transformed coordinate space for the component analysis technique, the training phase may also involve defining a set of anomaly thresholds for the anomaly detection model, which generally specify how much deviation from the predicted version of an observed data vector is acceptable in each dimension of the observed coordinator space (e.g., for each operating data variable). For instance, once the transformed coordinate space has been defined, controlled platform 102 may (1) transform (or "project") each training data vector from the observed coordinate space to the transformed coordinate space and then (2) inversely transform (or "project") each training data vector from the transformed coordinate space back to the observed coordinate space, thereby producing a predicted version of each training data vector. In turn, the controlled platform may evaluate the difference between the original and predicted versions of the training data vectors for each operating data variable in the observed coordinate space to define the acceptable deviation for each operating data variable.

In another implementation, the anomaly detection model may be based on linear regression. In such an implementation, the training phase may involve applying linear regression to the set of training data vectors to produce a predictive function that is representative of normal operation of the given software application, and then comparing each training data vector in the set to the predictive function to define a set of anomaly thresholds for the anomaly detection model (which generally specify how much deviation from the predicted function is acceptable for each operating data variable).

The anomaly detection approach may be based on other unsupervised learning techniques as well. It should also be understood that instead of performing these functions during a preliminary training phase, the controlled platform may perform one or more of these functions "on the fly" while evaluating observed data vectors. Other implementations are possible as well.

After the set of training data vectors has been compiled and the training phase has completed, controlled platform 102 may then engage in an "execution phase" during which controlled platform 102 may apply the anomaly detection model to observed data for instances of software application 110 that are running on uncontrolled platform 104 to monitor for anomalies in the instances of software application 110.

For instance, at block 406, controlled platform 102 may first obtain a set of observed data vectors that each comprise a snapshot of the values captured for the given set of operating variables at a particular point in time while instances of software application 110 are running on uncontrolled platform 104. In line with the discussion above, controlled platform 102 may obtain the set of observed data vectors for an instance of software application 110 in various manners. As one possibility, an instance of software application 110 may output observation data vectors to a database or the like for persistence, and controlled platform 102 may then query the database to obtain the observation data vectors. The observation data vectors may be captured and then obtained by controlled platform 102 in various other manners as well.

At block 408, controlled platform 102 may then apply the anomaly detection model to each such observed data vector to determine whether the data values for any of the operating data variables are anomalous. Depending on the form of unsupervised learning technique on which the anomaly detection model is based, this function may take various forms.

In line with the discussion above, in one implementation, the anomaly detection model may be based on a component analysis technique such as PCA. In such an implementation, applying the anomaly detection model may involve (1) transforming (or "projecting") each observed data vector from the observed coordinate space to the transformed coordinate space and then (2) inversely transforming (or "projecting") each observed data vector from the transformed coordinate space back to the observed coordinate space, thereby producing a predicted version of each observation data vector that comprises an estimate of what the values of the observed data vector should have been had the instance of software application 110 been operating normally. Techniques related to transforming an observed data vector from an observed coordinate space to a transformed coordinate space and then inversely transforming the observed data vector back to the observed coordinate space are described in further detail in U.S. patent application Ser. Nos. 15/367,012 and 15/788,622, which are incorporated herein by reference in their entirety.

According to this implementation, controlled platform 102 may then evaluate the predicted values of the observed data vectors as compared to the original values of the observed data vectors, to determine whether the deviation between the observed and predicted values of any operating variable (e.g., an operating variable corresponding to a given node in the topology) exceeds the anomaly thresholds for the anomaly detection model. As discussed above, these anomaly thresholds may be defined during the "training phase" of the process, and may generally specify how much deviation from the predicted version of an observed data vector is acceptable in each dimension of the observed coordinator space (e.g., for each operating data variable).

In another implementation, the anomaly detection model may be based on linear regression. In such an implementation, applying the anomaly detection model may involve comparing the observed data vectors to a predictive function to determining whether the deviation between the observed and predicted values of any operating variable exceeds the anomaly thresholds for the anomaly detection model (which generally specify how much deviation from the predicted function is acceptable for each operating data variable).

The function of applying the anomaly detection model to observed data for an instance of the given software application may take other forms as well.

At block 410, as a result of applying the anomaly detection model, controlled platform 102 may identify an anomaly in one or more of the operating variables for a given instance of software application 110, which may correspond to one or more nodes of the software application's topology.

At block 412, once any such anomaly is identified, controlled platform 102 may determine whether the root cause of the identified anomaly is likely a problem in software application 110 (e.g., a bug), or instead, whether the root cause of the anomaly is likely some other problem that is unrelated to software application 110 (e.g., a problem with the uncontrolled computing problem). This evaluation may take various forms.

As one possibility, after controlled platform 102 identifies an anomaly in an operating variable that corresponds to a given node of the software application's topology, controlled platform 102 may then evaluate the operating variables corresponding to other nodes in the topology that share dependencies with the given node, such as the given node's child nodes and/or sibling nodes. If the operating data variables corresponding to these other nodes appear to be normal (i.e., non-anomalous), then controlled platform 102 may determine that the root cause of the anomaly is likely a problem with the given node in software application 110. On the other hand, if at least some of the operating data variables corresponding to these other nodes are also anomalous, then controlled platform 102 may determine that the root cause of the anomaly is likely a problem that is unrelated to software application 110.

As an example, referring back to the example of FIG. 3, if controlled platform 102 identifies an anomaly in operating variable $V_4$ of node F (312), controlled platform 102 may then evaluate the operating variables of nodes E, G, H, and and/or I, which are either parent or child nodes of node F. If the operating data variables corresponding to these other nodes of nodes E, G, H, and/or I appear to be normal (i.e., non-anomalous), then controlled platform 102 may determine that the root cause of the anomaly is likely a problem with node F.

As another possibility, after controlled platform 102 identifies an anomaly in an at least one operating variable for software application 110, controlled platform 102 may then re-run an instance of software application 110 on controlled platform 102 under the same conditions that led to the anomaly being identified (e.g., by inputting the same source data into the instance of software application 110). In this respect, controlled platform 102 may attempt to replicate the anomalous operation of software application 110 each time an anomaly is identified in the instance of software application 110 running on uncontrolled platform 104, or alternatively, may attempt to replicate the anomalous operation of software application 110 only after first performing some other root cause analysis of the identified anomaly (e.g., by evaluating other nodes that share dependencies with an anomalous node).

In either case, if a similar anomaly is identified after re-running an instance of software application 110 on controlled platform 102 under the same conditions that gave rise to the anomaly at uncontrolled platform 104, controlled platform 102 may determine that the root cause of the anomaly is likely a problem with software application 110 (and in particular, with the node that corresponds to the operating variable exhibiting the anomaly). On the other hand, if no anomaly is identified after re-running the instance of software application 110 on controlled platform 102 under the same conditions that gave rise to the anomaly at uncontrolled platform 104, controlled platform 102 may determine that the root cause of the anomaly is likely a problem that is unrelated to software application 110.

The controlled platform's evaluation of the likely root cause of an identified anomaly may take various other forms as well.

At block 414, once controlled platform 102 determines the likely root cause of an identified anomaly in software application 110, this determination may trigger controlled platform 102 to take various one or more remedial actions, which may take various forms.

For instance, if controlled platform 102 determines that the root cause of the anomaly is likely a problem with software application 110, controlled platform 102 may cause a notification to be provided to an individual responsible for developing and/or testing software application 110, such as a quality assurance engineer. This notification may take various forms. In one example, the notification may include an identification of software application 110 for which an anomaly has been identified and perhaps also an identification of the particular node(s) in the software application's topology that correspond to the identified anomaly. The notification may include other information and take other forms as well.

Further, controlled platform 102 may cause a notification to be provided in various manners. As one example, controlled platform 102 may transmit the notification to a client station associated with an individual responsible for developing and/or testing software application 110, which may in turn present the notification to the individual. Once the individual responsible for developing and/or testing software application 110 receives this notification, the individual may then conduct further evaluation of the issue to determine if there is indeed a problem with software application 110.

On the other hand, if controlled platform 102 determines that the root cause of the anomaly is likely a problem unrelated to software application 110, the controlled platform may cause uncontrolled platform 104 to re-run software application 110 (e.g., by sending an instruction to the uncontrolled platform).

Based on its determination of the likely root cause of an identified anomaly in software application 110, controlled platform 102 may take various other remedial actions as well.

V. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

What is claimed is:

1. A computing system comprising:
   a network interface;
   at least one processor;
   a non-transitory computer-readable medium; and
   program instructions stored on the non-transitory computer-readable medium that are executable by the at least one processor to cause the computing system to:
      obtain a set of observed data vectors indicating operation of a topology of nodes that represents a given software application while the given software application is running on a first computing platform that is not controlled by a provider of the given software application, wherein each observed data vector in the set comprises data values captured for a given set of operating variables at a particular point in time;
      apply an anomaly detection model to the obtained set of observed data vectors, wherein the anomaly detection model is: (i) defined by applying an unsupervised learning technique to a set of training data vectors indicating operation of the topology of nodes that represents the given software application while the given software application is running on a second computing platform that is controlled by the provider of the given software application, and (ii) configured to evaluate whether a deviation between observed and predicted values for each operating variable of the given set of operating variables is indicative of an anomaly;
      based on the anomaly detection model, identify an anomaly in at least one operating variable in the given set of operating variables;
      evaluate whether any identified anomaly is indicative of a problem related to the given software application and thereby determine that at least one identified anomaly is indicative of a problem related to the given software application; and
      based on the determination that the at least one identified anomaly is indicative of a problem related to the given software application, cause a client station to present a notification indicating the at least one identified anomaly.

2. The computing system of claim 1, wherein the computing system is part of the second computing platform, and wherein the computing system further comprises program instructions stored on the non-transitory computer-readable medium that are executable by the at least one processor to cause the computing system to:
   run an instance of the given software application under conditions intended to simulate normal operation of the given software application;
   while running the instance of the given software application, capture data values for the given set of operating variables at various points in time, thereby producing the set of training data vectors, wherein each training data vector in the set comprises data values captured for the given set of operating variables at a particular point in time; and use the set of training data vectors to define the anomaly detection model.

3. The computing system of claim 2, wherein the unsupervised learning technique comprises a principal component analysis (PCA) technique, and wherein the program instructions that are executable by the at least one processor to cause the computing system to use the set of training data vectors to define the anomaly detection model comprise program instructions stored on the non-transitory computer-readable medium that are executable by the at least one processor to cause the computing system to:

use the set of training data vectors to define transformed coordinate space comprising a set of principal components; and use the set of training data vectors to define a set of anomaly thresholds that specify whether the deviation between observed and predicted values for each operating variable of the given set of operating variables is indicative of an anomaly.

4. The computing system of claim 1, wherein the unsupervised learning technique comprises a principal component analysis (PCA) technique, wherein the set of observed data vectors are originally represented in an observed coordinate space, and wherein the anomaly detection model uses the PCA technique to evaluate whether the deviation between observed and predicted values for each operating variable of the given set of operating variables is indicative of an anomaly by:

transforming each observed data vector from the observed coordinate space to a transformed coordinate space comprising a set of principal components;

inversely transforming each observed data vector from the transformed coordinate space back to the observed coordinate space, thereby producing a predictive data vector that corresponds to each observed data vector; and comparing the observed data vectors to the predictive data vectors to determine whether the deviation between observed and predicted values for each operating variable of the given set of operating variables is indicative of an anomaly.

5. The computing system of claim 1, wherein the unsupervised learning technique comprises a linear regression technique, and wherein the anomaly detection model uses the linear regression technique to evaluate whether the deviation between observed and predicted values for each operating variable of the given set of operating variables is indicative of an anomaly by:

applying linear regression to the set of training data vectors that are indicative of normal operation of the topology of nodes that represents the given software application while the given software application is running on the second computing platform and thereby defining a predictive function; and comparing each observed data vector to the predictive function to determine whether the deviation between observed and predicted values for each operating variable of the given set of operating variables is indicative of an anomaly.

6. The computing system of claim 1, wherein the program instructions that are executable by the at least one processor to cause the computing system to determine that at least one identified anomaly is indicative of a problem related to the given software application comprise program instructions stored on the non-transitory computer-readable medium that are executable by the at least one processor to cause the computing to:

determine that a given identified anomaly corresponds to a given node of the topology that represents the given software application;

evaluate operation of one or more other nodes in the topology that share dependencies with the given node to determine whether the one or more other nodes appear to be anomalous; and determine that a root cause of the given anomaly is likely a problem with the given node in the given software application if the one or more other nodes do not appear anomalous.

7. The computing system of claim 1, wherein the computing system is part of the second computing platform, and wherein the program instructions that are executable by the at least one processor to cause the computing system to determine that at least one identified anomaly is indicative of a problem related to the given software application comprise program instructions stored on the non-transitory computer-readable medium that are executable by the at least one processor to cause the computing system to:

run an instance of the given software application at the computing system under conditions that are selected to replicate those that led to a given anomaly being identified; and determine that the given anomaly is replicated at the computing system.

8. The computing system of claim 1, wherein the program instructions that are executable by the at least one processor to cause the computing system to determine that at least one identified anomaly is indicative of a problem related to the given software application comprise program instructions stored on the non-transitory computer-readable medium that are executable by the at least one processor to cause the computing system to:

instruct the first computing platform to re-run the given software application under conditions that are selected to replicate those that led to a given anomaly being identified; and determine that the given anomaly is replicated at the first computing platform.

9. The computing system of claim 1, wherein the client station is associated with an individual responsible for the given software application.

10. The computing system of claim 1, wherein the topology of nodes that represents the given software application comprises at least one source node, at least one processor node, and at least one sink node.

11. The computing system of claim 1, wherein the given set of operating variables comprises at least one respective operating variable for each node in the topology.

12. The computing system of claim 11, wherein the at least one respective operating variable for each node in the topology comprises one or more of a cache-related metric, a cluster-related metric, a virtual-machine metric, a user-interface metric, a database-query-related metric, a failure-type metric, a software-lifecycle metric, or an application-created metric.

13. A method executed by a computing system, the method comprising:

obtaining a set of observed data vectors indicating operation of a topology of nodes that represents a given software application while the given software application is running on a first computing platform that is not controlled by a provider of the given software application, wherein each observed data vector in the set comprises data values captured for a given set of operating variables at a particular point in time;

applying an anomaly detection model to the obtained set of observed data vectors, wherein the anomaly detection model is: (i) defined by applying an unsupervised learning technique to a set of training data vectors indicating operation of the topology of nodes that represents the given software application while the given software application is running on a second computing platform that is controlled by the provider of the given software application, and (ii) configured to evaluate whether a deviation between observed and predicted values for each operating variable of the given set of operating variables is indicative of an anomaly;

based on the anomaly detection model, identifying an anomaly in at least one operating variable in the given set of operating variables;

evaluating whether any identified anomaly is indicative of a problem related to the given software application and thereby determining that at least one identified anomaly is indicative of a problem related to the given software application; and based on determining that the at least one identified anomaly is indicative of a problem related to the given software application, causing a client station to present a notification indicating the at least one identified anomaly.

14. The method of claim 13, wherein the computing system is part of the second computing platform, the method further comprising:

running an instance of the given software application under conditions intended to simulate normal operation of the given software application;

while running the instance of the given software application, capturing data values for the given set of operating variables at various points in time, thereby producing the set of training data vectors, wherein each training data vector in the set comprises data values captured for the given set of operating variables at a particular point in time; and using the set of training data vectors to define the anomaly detection model.

15. The method of 14, wherein the unsupervised learning technique comprises a principal component analysis (PCA) technique, and wherein using the set of training data vectors to define the anomaly detection model comprises:

using the set of training data vectors to define transformed coordinate space comprising a set of principal components; and using the set of training data vectors to define a set of anomaly thresholds that specify whether the deviation between observed and predicted values for each operating variable of the given set of operating variables is indicative of an anomaly.

16. The method of claim 13, wherein the unsupervised learning technique comprises a principal component analysis (PCA) technique, wherein the set of observed data vectors are originally represented in an observed coordinate space, and wherein the anomaly detection model uses the PCA technique to evaluate whether the deviation between observed and predicted values for each operating variable of the given set of operating variables is indicative of an anomaly by:

transforming each observed data vector from the observed coordinate space to a transformed coordinate space comprising a set of principal components;

inversely transforming each observed data vector from the transformed coordinate space back to the observed coordinate space, thereby producing a predictive data vector that corresponds to each observed data vector; and comparing the observed data vectors to the predictive data vectors to determine whether the deviation between observed and predicted values for each operating variable of the given set of operating variables is indicative of an anomaly.

17. The method of claim 13, wherein the unsupervised learning technique comprises a linear regression technique, and wherein the anomaly detection model uses the linear regression technique to evaluate whether the deviation between observed and predicted values for each operating variable of the given set of operating variables is indicative of an anomaly by:

applying linear regression to the set of training data vectors that are indicative of normal operation of the topology of nodes that represents the given software application while the given software application is running on the second computing platform and thereby defining a predictive function; and comparing each observed data vector to the predictive function to determine whether the deviation between observed and predicted values for each operating variable of the given set of operating variables is indicative of an anomaly.

18. A non-transitory computer-readable medium having instructions stored thereon that are executable by at least one processor to cause a computing system to:

obtain a set of observed data vectors indicating operation of a topology of nodes that represents a given software application while the given software application is running on a first computing platform that is not controlled by a provider of the given software application, wherein each observed data vector in the set comprises data values captured for a given set of operating variables at a particular point in time;

apply an anomaly detection model to the obtained set of observed data vectors, wherein the anomaly detection model is: (i) defined by applying an unsupervised learning technique to a set of training data vectors indicating operation of the topology of nodes that represents the given software application while the given software application is running on a second computing platform that is controlled by the provider of the given software application, and (ii) configured to evaluate whether a deviation between observed and predicted values for each operating variable of the given set of operating variables is indicative of an anomaly;

based on the anomaly detection model, identify an anomaly in at least one operating variable in the given set of operating variables;

evaluate whether any identified anomaly is indicative of a problem related to the given software application and thereby determine that at least one identified anomaly is indicative of a problem related to the given software application; and based on the determination that the at least one identified anomaly is indicative of a problem related to the given software application, cause a client station to present a notification indicating the at least one identified anomaly.

19. The non-transitory computer-readable storage medium of claim 18, wherein the computing system is part of the second computing platform, and wherein the non-transitory computer-readable storage medium further comprises program instructions that are executable by the at least one processor to cause the computing system to:
   run an instance of the given software application under conditions intended to simulate normal operation of the given software application;
   while running the instance of the given software application, capture data values for the given set of operating variables at various points in time, thereby producing the set of training data vectors, wherein each training data vector in the set comprises data values captured for the given set of operating variables at a particular point in time; and
   use the set of training data vectors to define the anomaly detection model.

20. The non-transitory computer-readable storage medium of claim 18, wherein the program instructions that are executable by the at least one processor to cause the computing system to determine that at least one identified anomaly is indicative of a problem related to the given software application comprise program instructions that are executable by the at least one processor to cause the computing system to:
   determine that a given identified anomaly corresponds to a given node of the topology that represents the given software application;
   evaluate operation of one or more other nodes in the topology that share dependencies with the given node to determine whether the one or more other nodes appear to be anomalous; and
   determine that a root cause of the given anomaly is likely a problem with the given node in the given software application if the one or more other nodes do not appear anomalous.

* * * * *